UNITED STATES PATENT OFFICE.

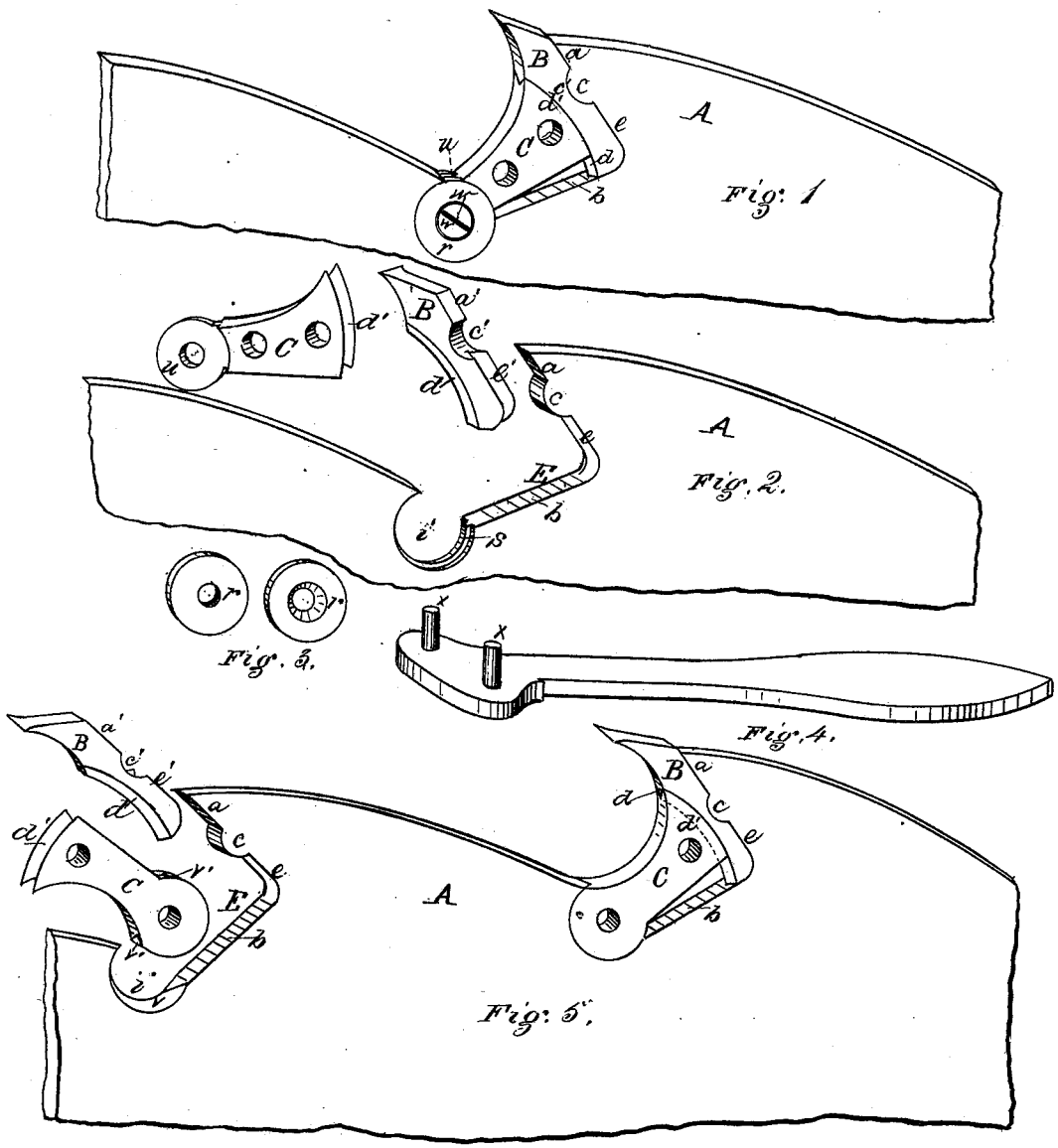

WILLIAM BURGER, OF PITTSBURG, PENNSYLVANIA.

IMPROVEMENT IN CLAMP-PIECES FOR INSERTIBLE SAW-TEETH.

Specification forming part of Letters Patent No. 195,699, dated October 2, 1877; application filed September 3, 1877.

*To all whom it may concern:*

Be it known that I, WILLIAM BURGER, of Pittsburg, county of Allegheny, State of Pennsylvania, have invented or discovered a new and useful Improvement in Clamp-Pieces for Insertible Saw-Teeth; and I do hereby declare the following to be a full, clear, concise, and exact description thereof, reference being had to the accompanying drawing, making a part of this specification, in which—like letters indicating like parts—

Figure 1 is a perspective view of my improved insertible saw-tooth and the devices employed for holding the same in place. Fig. 2 is a like view of the same devices, but showing them out of place, the better to illustrate their construction. Fig. 3 is a like view of washers employed for pivoting the binding device to the saw-plate, as shown in Fig. 1. Fig. 4 represents a convenient tool with which the binding device may be operated, and Fig. 5 shows in perspective a modified form of the device employed to bind the teeth in place.

My present improvement relates to saws having insertible teeth, and also certain devices for holding such teeth in place.

The various devices which have heretofore been employed for holding insertible saw-teeth have been made of parts separate or unconnected with the saw-plate, except as they were clamped in place. Such devices, on being loosened for the purpose of changing teeth, are liable to drop and be lost in the sawdust and other waste about the saw. This is especially the case when, as often happens, the saw-teeth are changed in a great hurry.

My improved fastening is designed to overcome this difficulty, as it is pivoted to or connected with the saw-plate, thus insuring its safety, and its relation to the tooth and saw-plate is such that, on being loosened from the tooth, the tooth will not fall out, but will remain in place, or nearly so, until removed by the operator; and, in addition to this feature, I believe my improved device to be new, both in its construction and mode of operation.

In the drawing, A represents a section of saw-plate, in the periphery of which angular recesses E are made, in which the teeth are bound. The side $a\ e$ of this recess, against which the tooth is held, is preferably at, or nearly at, right angles to the edge $b$. As seen in Fig. 2, the lower part $e$ is made with a V-tongue, and the upper part $a$ is made plain-faced, though it also may be made with a V-tongue, if desired. Between the parts $a$ and $e$, I prefer to make a projecting lug, $c$, of curved face outline. B represents the insertible tooth, which, when in place, operates in the usual way. The edge $a'\ c'\ e'$ of this tooth is made to conform to the edge $a,\ c\ e$ of the plate, $a'$ being a plain face, $c'$ being a concave recess, the counterpart of the lug $c$, and the edge $e'$ having a V-groove corresponding to the tongue $e$. The two edges will thus fit firmly and closely together, and when the tooth is held to place it will be secure as against both lateral and endwise displacement.

I prefer to make the length of the shank or stem of the tooth such that it may rest firmly on the edge $b$ of the plate, as shown in Fig. 1.

The point or cutting-edge of the tooth is made in the usual way. The face or edge $d$ of the tooth is concave in outline, and is drawn to the same curve as the adjacent edge $d'$ of the binding-piece C. The edge $d$ has a V-tongue, and the edge $d'$ a corresponding V-groove. One end of the swinging binding-piece C is seated in the lower angle of the recess E opposite the tooth B. This binding-piece may be held in its seat or socket in either of two ways, its operation in binding the tooth in place being the same in either case; and, first, it may be pivoted in its socket, as illustrated in Figs. 1 and 2. In this case a round hole, $i$, is drilled through the saw-plate, opening into the recess E, as shown. This hole $i$ is then countersunk from both sides, or sockets made around its periphery by reaming or otherwise. A projecting collar, $s$, is thus formed which is thinner than the saw-plate.

Washers $r$ are stamped or otherwise cut out to neatly fit the reamed recesses or sockets, and seat upon or rest against the collar $s$. A knuckle, $u$, is made on the end of the binding-piece $c$ of the size and form of the hole $i$, in which it rests. This knuckle is made a little thinner than the collar $s$, which incloses it, so that the binding-piece may be free to turn and not be bound by the inclosing washers $r$. The washers $r$ may be secured in place by a screw, $w$, or a rivet passing through the center of washers and knuckle.

The pivot or center of motion of the binding-piece C is placed a little eccentric to the curved edge $d'$ of the tooth, and is arranged so that as the binding-piece is swung down against the tooth it shall bind against it as a wedge, and the harder the binding-piece is pressed down the tighter the tooth will be held. I believe it to be wholly new, for fastening saw-teeth, to seat one end of the binding device in a socket which is eccentric to the face or edge of the tooth against which it acts.

A second form of socket is shown in Fig. 5, where the binding-piece is not pivoted to the saw-plate, but is held as against lateral displacement by a V-tongue, $v$, on the edge of the hole or socket $i$, fitting into a V-groove, $v'$, on the end or knuckle of the binding-piece C. The V-tongue may be easily made by drilling the hole $i$, and countersinking it from both sides. The binding-piece moves eccentric to the edge of the tooth, as in the previous case, and its operation in holding the tooth is the same.

Fig. 4 shows a tool by which the binding-piece may be conveniently operated, as by placing the pins $x$ in the corresponding holes in the binding-piece it will operate as a lever, by which the binding-piece may be turned on its socket or pivot, so as either to release or bind the tooth, as desired.

Some of the advantages which attend my improvement are: Cheapness and ease in construction. The fittings being plain and uniform in outline, they can be formed with precision and dispatch, and made to fit with great exactness, as much of the work can be done upon a lathe. Second, from the form and operation of the devices, the tooth is held in place with almost as great security as though it were made solid with the saw-plate. Third, the direct effect of the work done by the saw is to force the binding-piece down, and thus hold the tooth tighter, or, in any case, to prevent it from becoming loosened. Fourth, the binding device being pivoted to the saw-plate, and having only the necessary amount of motion, there is no danger that either it or the tooth will be lost when change is made. The operation of the devices being simple and direct, a change of teeth can be made with facility and dispatch; and, again, the form by which the tooth is fitted to the saw-plate makes its bearing firm and secure.

I claim herein as my invention—

1. The combination of a saw-plate, an insertible tooth, and a binding device permanently attached to the plate by a flexible joint-connection, substantially as described with reference to Fig. 1.

2. The combination of a saw-plate having a recess, E, therein, an insertible tooth adapted to a portion of such recess, and a binding device with an eccentric face arranged in a seat or socket in front of the edge of the tooth against which the binding device acts, substantially as described.

3. The insertible tooth B, having the edge $a'$ $c'$ $e'$, and curved face $d$, made eccentric to the swinging binding device, substantially as set forth.

4. As a means of securing an insertible tooth to a saw-plate, the binding-piece C, seated or pivoted at one end, and having its free end formed to act as an eccentric on the face or edge of the tooth against which it presses, and adapted to the form of such edge, substantially as set forth.

5. The combination of saw-plate A, binding-piece C, one or more washers, $r$, and rivet or screw $w$, substantially as set forth.

In testimony whereof I have hereunto set my hand.

WILLIAM BURGER.

Witnesses:
 J. J. McCORMICK,
 C. L. PARKER.